US012720040B2

(12) United States Patent
Kato

(10) Patent No.: US 12,720,040 B2
(45) Date of Patent: Aug. 25, 2026

(54) IMAGE DECODING DEVICE, IMAGE DECODING METHOD, AND PROGRAM

(71) Applicant: KDDI CORPORATION, Tokyo (JP)

(72) Inventor: Haruhisa Kato, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 270 days.

(21) Appl. No.: 18/394,098

(22) Filed: Dec. 22, 2023

(65) Prior Publication Data

US 2024/0179299 A1 May 30, 2024

Related U.S. Application Data

(63) Continuation of application No. PCT/JP2022/026103, filed on Jun. 29, 2022.

(30) Foreign Application Priority Data

Jun. 29, 2021 (JP) ................................ 2021-108098

(51) Int. Cl.

*H04N 19/119* (2014.01)
*H04N 19/105* (2014.01)
*H04N 19/11* (2014.01)
*H04N 19/124* (2014.01)
*H04N 19/159* (2014.01)
*H04N 19/176* (2014.01)

(Continued)

(52) U.S. Cl.

CPC ........... *H04N 19/105* (2014.11); *H04N 19/11* (2014.11); *H04N 19/119* (2014.11); *H04N 19/124* (2014.11); *H04N 19/159* (2014.11); *H04N 19/176* (2014.11); *H04N 19/18* (2014.11); *H04N 19/182* (2014.11); *H04N 19/593* (2014.11)

(58) Field of Classification Search

CPC .... H04N 19/105; H04N 19/11; H04N 19/119; H04N 19/124; H04N 19/159; H04N 19/176; H04N 19/18; H04N 19/182; H04N 19/593; H04N 19/107; H04N 19/14; H04N 19/167; H04N 19/51

See application file for complete search history.

(56) References Cited

U.S. PATENT DOCUMENTS 10,142,627 B2 11/2018 Zhao et al.
10,404,980 B1 9/2019 Zhao et al.

(Continued)

FOREIGN PATENT DOCUMENTS

EP 3840387 A1 6/2021
JP 2021027464 A 2/2021

(Continued)

OTHER PUBLICATIONS

Japanese Office Action (and an English language translation thereof) dated Jul. 2, 2024, issued in counterpart Japanese Application No. 2021-108098.

(Continued)

*Primary Examiner* — Kathleen M Broughton

(74) *Attorney, Agent, or Firm* — Holtz, Holtz & Volek PC

(57) ABSTRACT

In an image decoding device (200), a synthesis unit (280) is configured to generate predicted pixels by performing weighted averaging processing using weighting factors on predicted pixels outputted by an intra prediction unit (260) and predicted pixels outputted by a motion compensation unit (270).

20 Claims, 7 Drawing Sheets

(51) Int. Cl.

| | |
|---|---|
| ***H04N 19/18*** | (2014.01) |
| ***H04N 19/182*** | (2014.01) |
| ***H04N 19/593*** | (2014.01) |

(56) References Cited

U.S. PATENT DOCUMENTS

| | | | | |
|---|---|---|---|---|
| 10,841,593 | B2 | 11/2020 | Zhao et al. | |
| 11,095,882 | B2 | 8/2021 | Zhang et al. | |
| 11,252,403 | B2 | 2/2022 | Lee | |
| 11,463,689 | B2 | 10/2022 | Zhao et al. | |
| 11,743,453 | B2 | 8/2023 | Zhang et al. | |
| 2016/0373742 | A1 | 12/2016 | Zhao et al. | |
| 2016/0373770 | A1 | 12/2016 | Zhao et al. | |
| 2016/0373782 | A1 | 12/2016 | Zhao et al. | |
| 2020/0007882 | A1* | 1/2020 | Abe | H04N 19/137 |
| 2020/0021799 | A1 | 1/2020 | Zhao et al. | |
| 2020/0021803 | A1 | 1/2020 | Zhao et al. | |
| 2020/0195921 | A1* | 6/2020 | Van der Auwera | H04N 19/80 |
| 2020/0221082 | A1 | 7/2020 | Zhao et al. | |
| 2021/0227208 | A1* | 7/2021 | Lee | H04N 19/593 |
| 2021/0377522 | A1 | 12/2021 | Zhao et al. | |
| 2021/0409764 | A1* | 12/2021 | Iwamura | H04N 19/105 |

FOREIGN PATENT DOCUMENTS

| | | | | |
|---|---|---|---|---|
| JP | 2021083122 | A | 5/2021 | |
| JP | 2021513815 | A | 5/2021 | |
| KR | 20200041810 | A * | 4/2020 | H04N 19/176 |
| WO | 2020103931 | A1 | 5/2020 | |
| WO | WO-2020184566 | A1 * | 9/2020 | H04N 19/61 |

OTHER PUBLICATIONS

Japanese Office Action (and an English language translation thereof) dated Jul. 15, 2025, issued in counterpart Japanese Application No. 2024-181448.

CE4: Summary report on inter-prediction with geometric partitioning, JVET-Q0024.

International Search Report (ISR) (and an English language translation thereof) dated Sep. 20, 2022, issued in International Application No. PCT/JP2022/026103.

ITU-T H.266 Versatile Video Coding.

Written Opinion dated Sep. 20, 2022, issued in International Application No. PCT/JP2022/026103.

Blaser, et al., "Description of SDR and 360 video coding technology proposal by RWTH Aachen University", JVET-J0023-rl, pp. 1, 28-32.

Chen, et al., "Joint Inter-Intra Prediction Based on Mode-Varian and Edge-Directed Weighting Approaches in Video Coding", 2014 IEEE, International Conference on Acoustic. Speech and Signal Processing (ICASSP), pp. 7372-7376.

Kidani, et al., "AHG12: Gpm with inter and intra prediction", JVET-W0110-v2.

* cited by examiner

FIG. 4

(w*SMALL REGION A + (8 - w)*SMALL REGION B + 4)/8

FIG. 7

UNIT BLOCK (w*r*INTRA PREDICTION + (64 - w*r)*MOTION COMPENSATION + 32)/64

| 8 | 8 | 8 | 8 | 8 | 8 | 8 | 8 |
|---|---|---|---|---|---|---|---|
| 8 | 7 | 7 | 7 | 7 | 6 | 6 | 6 |
| 8 | 7 | 6 | 6 | 6 | 5 | 5 | 5 |
| 8 | 7 | 6 | 5 | 5 | 5 | 4 | 4 |
| 8 | 7 | 6 | 5 | 4 | 4 | 4 | 3 |
| 8 | 6 | 5 | 5 | 4 | 3 | 3 | 3 |
| 8 | 6 | 5 | 4 | 4 | 3 | 2 | 2 |
| 8 | 6 | 5 | 4 | 3 | 3 | 2 | 1 |

WEIGHTING FACTOR r

IMAGE DECODING DEVICE, IMAGE DECODING METHOD, AND PROGRAM

CROSS-REFERENCE TO RELATED APPLICATIONS

The present application is a continuation of PCT Application No. PCT/JP2022/026103, filed on Jun. 29, 2022, which claims the benefit of Japanese patent application No. 2021-108098 filed on Jun. 29, 2021, the entire contents of which are incorporated herein by reference in its entirety.

TECHNICAL FIELD

The present invention relates to an image decoding device, an image decoding method, and a program.

BACKGROUND ART

Non-Patent Reference 1 (ITU-T H.266 VVC) and Non-Patent Reference 2 (JVET-Q0024) disclose a geometric partitioning mode (GPM).

The GPM is a mode in which a rectangular block is obliquely divided into two pieces and each piece is subjected to motion compensation processing. Specifically, the divided two regions are subjected to motion compensation processing using merge vectors and subjected to weighted averaging processing, and are thus synthesized. For the oblique division, 64 patterns are prepared according to the angle and the position.

SUMMARY OF THE INVENTION

However, in Non-Patent References 1 and 2, the object is limited to a merge mode including motion compensation, and hence there has been a problem that there is room for improvement in encoding performance.

Thus, the present invention has been made in view of the above-described problem, and an object of the present invention is to provide an image decoding device, an image decoding method, and a program capable of further improving encoding efficiency.

The first aspect of the present invention is summarized as an image decoding device including: a decoding unit configured to decode and output prediction information and quantized values; an inverse quantization unit configured to subject the quantized values outputted by the decoding unit to inverse quantization processing to generate transformation coefficients and output the transformation coefficients; an inverse transformation unit configured to subject the transformation coefficients outputted by the inverse quantization unit to inverse transformation processing to generate prediction residuals and output the prediction residuals; a synthesis unit configured to generate predicted pixels on the basis of the prediction information outputted by the decoding unit and output the predicted pixels; an adder configured to add the prediction residuals outputted by the inverse transformation unit and the predicted pixels outputted by the synthesis unit to acquire decoded pixels and output the decoded pixels; an accumulation unit configured to accumulate the decoded pixels outputted by the adder; an intra prediction unit configured to generate predicted pixels on the basis of the decoded pixels outputted by the adder and the prediction information outputted by the decoding unit and output the predicted pixels; and a motion compensation unit configured to generate predicted pixels on the basis of the decoded pixels accumulated by the accumulation unit and the prediction information outputted by the decoding unit and output the predicted pixels, wherein the synthesis unit is configured to generate the predicted pixels by performing weighted averaging processing using weighting factors on the predicted pixels outputted by the intra prediction unit and the predicted pixels outputted by the motion compensation unit.

The second aspect of the present invention is summarized as an image decoding method, including the steps of: (A) decoding and outputting prediction information and quantized values; (B) subjecting the quantized values outputted in the step (A) to inverse quantization processing to generate transformation coefficients and outputting the transformation coefficients; (C) subjecting the transformation coefficients outputted in the step (B) to inverse transformation processing to generate prediction residuals and outputting the prediction residuals; (D) generating predicted pixels on the basis of the prediction information outputted in the step (A) and outputting the predicted pixels; (E) adding the prediction residuals outputted in the step (C) and the predicted pixels outputted in the step (D) to acquire decoded pixels and outputting the decoded pixels; (F) accumulating the decoded pixels outputted in the step (E); (G) generating predicted pixels on the basis of the decoded pixels outputted in the step (E) and the prediction information outputted in the step (A) and outputting the predicted pixels; and (H) generating predicted pixels on the basis of the decoded pixels accumulated in the step (F) and the prediction information outputted in the step (A) and outputting the predicted pixels, wherein in the step (D), the predicted pixels are generated by performing weighted averaging processing using weighting factors on the predicted pixels outputted in the step (G) and the predicted pixels outputted in the step (H), The third aspect of the present invention is summarized as a program for causing a computer to function as an image decoding device, the image decoding device including: a decoding unit configured to decode and output prediction information and quantized values; an inverse quantization unit configured to subject the quantized values outputted by the decoding unit to inverse quantization processing to generate transformation coefficients and output the transformation coefficients; an inverse transformation unit configured to subject the transformation coefficients outputted by the inverse quantization unit to inverse transformation processing to generate prediction residuals and output the prediction residuals; a synthesis unit configured to generate predicted pixels on the basis of the prediction information outputted by the decoding unit and output the predicted pixels; an adder configured to add the prediction residuals outputted by the inverse transformation unit and the predicted pixels outputted by the synthesis unit to acquire decoded pixels and output the decoded pixels; an accumulation unit configured to accumulate the decoded pixels outputted by the adder; an intra prediction unit configured to generate predicted pixels on the basis of the decoded pixels outputted by the adder and the prediction information outputted by the decoding unit and output the predicted pixels; and a motion compensation unit configured to generate predicted pixels on the basis of the decoded pixels accumulated by the accumulation unit and the prediction information outputted by the decoding unit and output the predicted pixels, wherein the synthesis unit is configured to generate the predicted pixels by performing weighted averaging processing using weighting factors on the predicted pixels outputted by the intra prediction unit and the predicted pixels outputted by the motion compensation unit.

According to the present invention, it is possible to provide an image decoding device, an image decoding method, and a program capable of further improving encoding efficiency.

BRIEF DESCRIPTION OF THE DRAWINGS

FIG. 4 is a diagram illustrating an example of a case where a predicted pixel is generated by allocating intra prediction and motion compensation to small region A and small region B of FIG. 2, respectively, in the image decoding device 200 according to an embodiment.

FIG. 7 is a diagram illustrating an example of a calculation method using weighting factors and weighted averaging processing.

DESCRIPTION OF EMBODIMENTS

An embodiment of the present invention will be described hereinbelow with reference to the drawings. Note that the constituent elements of the embodiment below can, where appropriate, be substituted with existing constituent elements and the like, and that a wide range of variations, including combinations with other existing constituent elements, is possible. Therefore, there are no limitations placed on the content of the invention as in the claims on the basis of the disclosures of the embodiment hereinbelow.

Figure 1:
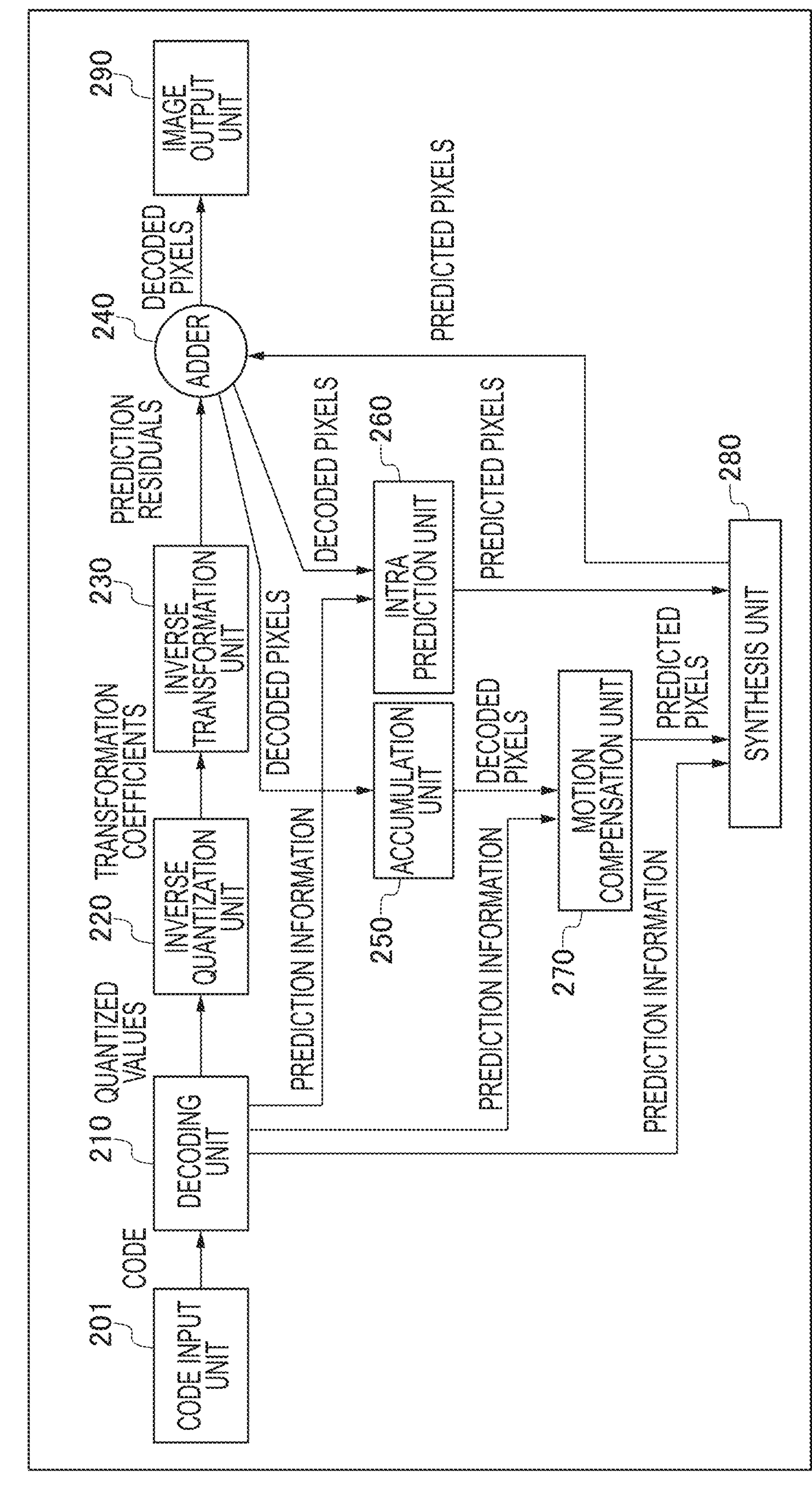
FIG. 1 is a diagram illustrating an example of functional blocks of an image decoding device 200 according to an embodiment.

Hereinbelow, an image decoding device 200 according to a first embodiment of the present invention is described with reference to FIGS. 1 to 7. FIG. 1 is a diagram illustrating an example of functional blocks of the image decoding device 200 according to the present embodiment.

As illustrated in FIG. 1, the image decoding device 200 includes a code input unit 201, a decoding unit 210, an inverse quantization unit 220, an inverse transformation unit 230, an adder 240, an accumulation unit 250, an intra prediction unit 260, a motion compensation unit 270, a synthesis unit 280, and an image output unit 290.

The code input unit 201 is configured to acquire encoded information outputted by an image encoding device and output the encoded information.

The decoding unit 210 is configured to subject encoded information outputted by the code input unit 201 to variable length decoding processing to generate quantized values and prediction information and output the quantized values and the prediction information. Here, as illustrated in FIG. 1, the decoding unit 210 is configured to output quantized values to the inverse quantization unit 220 and output prediction information to the intra prediction unit 260, the motion compensation unit 270, and the synthesis unit 280.

The inverse quantization unit 220 is configured to subject quantized values outputted by the decoding unit 210 to inverse quantization processing to generate transformation coefficients and output the transformation coefficients. Here, as illustrated in FIG. 1, the inverse quantization unit 220 is configured to output transformation coefficients to the inverse transformation unit 230.

The inverse transformation unit 230 is configured to subject transformation coefficients outputted by the inverse quantization unit 220 to inverse transformation processing to generate prediction residuals and output the prediction residuals. Here, as illustrated in FIG. 1, the inverse transformation unit 230 is configured to output prediction residuals to the adder 240.

The adder 240 is configured to acquire prediction residuals outputted by the inverse transformation unit 230 and predicted pixels outputted by the synthesis unit 280. Here, the adder 240 is configured to add the prediction residuals and the predicted pixels to acquire decoded pixels and output the decoded pixels. Here, as illustrated in FIG. 1, the adder 240 is configured to output decoded pixels to the accumulation unit 250, the intra prediction unit 260, and the image output unit 290.

The accumulation unit 250 is configured to cumulatively accumulate decoded pixels outputted by the adder 240. The accumulation unit 250 is configured to output decoded pixels in response to a request from the motion compensation unit 270.

The intra prediction unit 260 is configured to, on the basis of decoded pixels outputted by the adder 240 and prediction information outputted by the decoding unit 210, generate predicted pixels as approximate values of input pixels in a small region set by the synthesis unit 280 described later. Here, as illustrated in FIG. 1, the intra prediction unit 260 is configured to output predicted pixels to the synthesis unit 280.

The motion compensation unit 270 is configured to, on the basis of decoded pixels obtained with reference to the accumulation unit 250 and prediction information outputted by the decoding unit 210, generate predicted pixels as approximate values of input pixels in a small region set by the synthesis unit 280 described later. Here, as illustrated in FIG. 1, the motion compensation unit 270 is configured to output predicted pixels to the synthesis unit 280.

The image output unit 290 is configured to output decoded pixels outputted by the adder 240.

An example of the function of the synthesis unit 280 will now be described with reference to FIGS. 2 to 7.

The synthesis unit 280 is configured to generate predicted pixels on the basis of prediction information outputted by the decoding unit 210, predicted pixels outputted by the intra prediction unit 260, and predicted pixels outputted by the motion compensation unit 270 and output the generated predicted pixels.

Further, the synthesis unit 280 is configured to generate such predicted pixels by performing weighted averaging processing using weighting factors on predicted pixels outputted by the intra prediction unit 260 and predicted pixels outputted by the motion compensation unit 270.

Here, the role of the synthesis unit 280 is to, in order to give high accuracy compensation to a decoding target block in the adder 240 in a subsequent stage, select weighting factors for a plurality of predicted pixels most suitable for the decoding target block and synthesize, according to the weighting factors, pluralities of predicted pixels acquired from the intra prediction unit 260 and the motion compensation unit 270.

For the weighting factor, a plurality of patterns in each of which an arbitrary value is preset for each pixel of a unit block are prepared, and the synthesis unit 280 is configured to, according to prediction information acquired from the decoding unit 210, specify a weighting factor used for each pixel from the weighting factors of the plurality of patterns.

The total value of weighting factors for a plurality of predicted pixels is designed to be 1 on a pixel basis, and a result obtained by subjecting the plurality of predicted pixels to weighted averaging processing using the weighting factors and performing synthesis is taken as predicted pixels obtained by the synthesis unit 280.

A predicted pixel for which the weighting factor is set to a value other than 0 is employed, and a predicted pixel for which the weighting factor is set to 0 is not used; thus, as a concept, this operation is equivalent to dividing a unit block into a plurality of small regions, and determines which pixels of the plurality of predicted pixels should be used for where, and at what ratio.

Here, the weighting factors are desirably distributed in a non-rectangular configuration because a rectangular distribution such as bisection can be expressed by smaller unit blocks.

Figure 2:
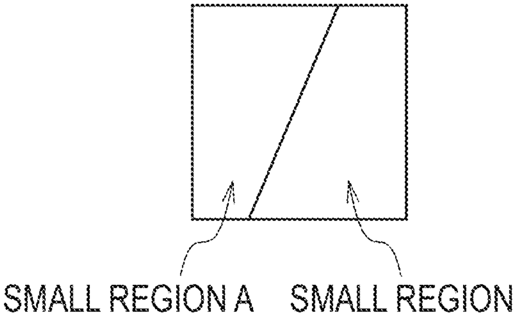
FIG. 2 is a diagram illustrating an example of a case where a unit block is divided into small region A and small region B in the image decoding device 200 according to an embodiment.

In FIG. 2, an example of a case where unit blocks are distributed in an oblique configuration is illustrated, and the unit block is divided into small region A and small region B by an oblique straight line.

Figure 3:
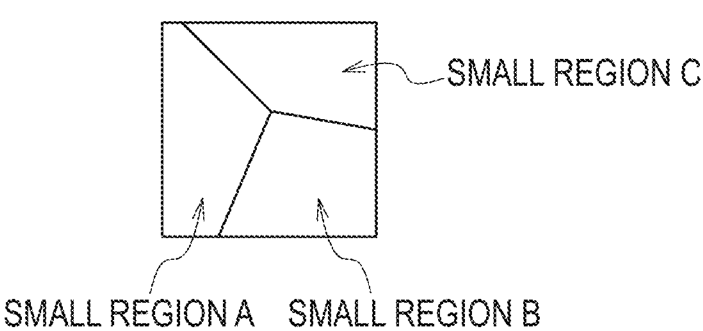
FIG. 3 is a diagram illustrating an example of a case where a unit block is divided into small regions A to C in the image decoding device 200 according to an embodiment.

In the example of FIG. 3, the unit block is divided into small region A, small region B, and small region C by a plurality of oblique straight lines, specifically three oblique straight lines that meet or intersect at a common point to provide the three small regions A, B and C. The number of divisions may be an arbitrary number.

In the example of FIG. 3, predicted pixels may be generated by allocating intra prediction or/and motion compensation to each of small regions A to C. That is, the synthesis unit 280 may be configured to, in each of the plurality of small regions A to C obtained by dividing a unit block of a decoding target block, employ predicted pixels generated by the intra prediction unit 260 or/and predicted pixels generated by the motion compensation unit 270.

At this time, if the number of divisions is increased, due to the necessity to encode prediction information such as intra prediction, there is a problem that encoding efficiency cannot be improved. In order to solve this problem, a procedure of using a prediction mode according to the division of small regions is taken.

Figure 4:
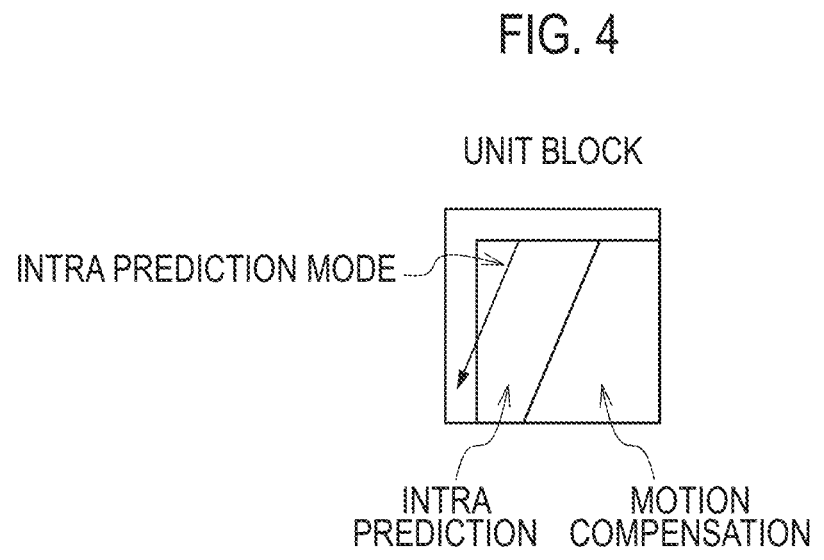

FIG. 4 illustrates an example in which predicted pixels are generated by allocating intra prediction and motion compensation to small region A and small region B of FIG. 2, respectively. Alternatively, an arbitrary combination such as allocating different intra predictions to small regions A and B can be taken. The intra prediction may be performed before a deblocking filter is applied, or may be performed after a deblocking filter is applied. It is desirable to predetermine which one to use.

For intra prediction, the intra prediction mode may be limited according to the division configuration of small regions. That is, when intra prediction is allocated to a small region, the synthesis unit 280 may be configured to use an intra prediction mode according to the division configuration of small regions.

For example, as illustrated in FIG. 4, the synthesis unit 280 can limit the intra prediction mode to only one type of mode in a direction parallel to the direction in which division is made by a straight line forming the division configuration.

Alternatively, the synthesis unit 280 may limit the intra prediction mode to only two types of mode in directions parallel to and perpendicular to the direction in which division is made by a straight line forming the division configuration.

Thus, by limiting the intra prediction mode to ones according to the direction of the division configuration, an effect of adaptively reducing the amount of codes representing intra prediction modes is obtained.

The decoding unit 210 may be configured to adaptively decode the prediction mode limited according to the type of small region division.

For example, in the case of limiting the intra prediction mode to directions parallel to and perpendicular to the direction in which division is made by a straight line forming the division configuration, the decoding unit 210 may be configured to decode the intra prediction mode as the parallel direction when the code inputted to the decoding unit 210 is "0", and decode the intra prediction mode as the perpendicular direction when the code inputted to the decoding unit 210 is "1". By using such a configuration, the prediction information of the intra prediction mode can be expressed by one bit, and therefore an effect of greatly improving encoding efficiency is obtained.

The synthesis unit 280 may be configured to include a specific intra prediction mode as an option of the prediction mode. For example, the synthesis unit 280 may be configured to always add, as an option, a specific intra prediction mode not depending on a direction, such as a planar mode or DC.

For example, the synthesis unit 280 may limit the intra prediction mode to only three types, that is, modes in directions parallel to and perpendicular to the direction in which division is made by a straight line forming the division configuration, and a planar mode not depending on a direction.

Alternatively, the synthesis unit 280 may limit the intra prediction mode to only four types, that is, modes in directions parallel to and perpendicular to the direction in which division is made by a straight line forming the division configuration, and a planar mode and a DC mode not depending on a direction.

Further, in the case where MRLs disclosed in Non-Patent Reference 1 for selecting, from a plurality of reference pixel lines adjacent to a decoding target block, reference pixels used for generation of predicted pixels are effective, the synthesis unit 280 may use, as reference pixels referred to in the above-described intra prediction mode according to the division configuration, reference pixels selected with the MRLs.

Figure 5:
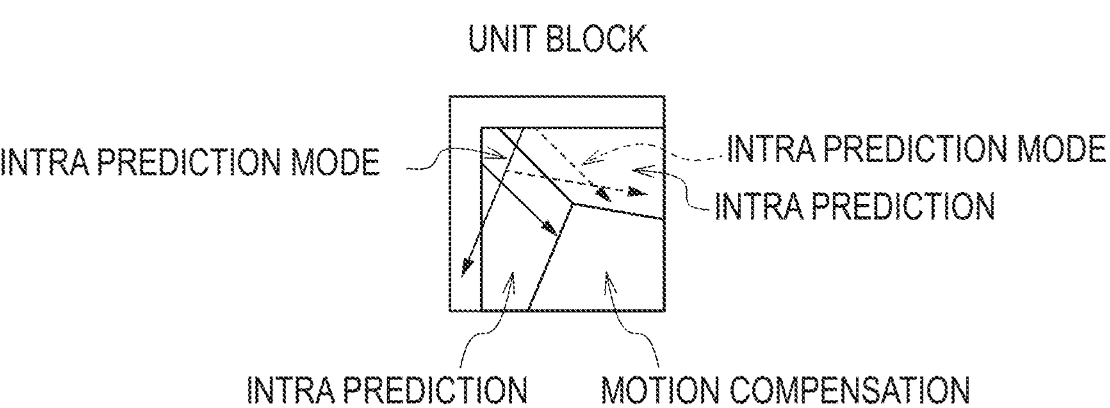
FIG. 5 is a diagram illustrating an example of a case where a predicted pixel is generated by allocating intra prediction, motion compensation, and intra prediction to small regions A to C of FIG. 3, respectively, in the image decoding device 200 according to an embodiment.

In FIG. 5, intra prediction, motion compensation, and intra prediction are allocated to small regions A to C of FIG. 3, respectively.

In each intra prediction, all or some of intra prediction modes according to the directions in which division is made by a plurality of straight lines forming small regions A to C can be included as options. That is, the synthesis unit 280 may be configured to include, as options, at least some of intra prediction modes according to the directions in which division is made by straight lines forming the division configuration of small regions.

The synthesis unit 280 may determine the number of intra prediction modes on the basis of the block size of the decoding target, the intra prediction modes being to be included as options.

For example, when the block size of the unit block is small, the synthesis unit 280 may generate predicted pixels by using predicted pixels generated by one intra prediction mode according to the direction in which division is made by a straight line forming the division configuration of small regions and a plurality of intra prediction modes in the vicinity of the one intra prediction mode.

Further, when the block size of the unit block is large, the synthesis unit 280 may generate predicted pixels by only one intra prediction mode according to the direction in which division is made by a straight line forming the division configuration of small regions.

The positions of reference pixels between adjacent intra prediction modes (the distances between reference pixels) vary depending on the size of the unit block; thus, in a large-size block in which the positions of reference pixels are likely to be away from each other as above, the intra prediction mode may be limited to, for example, one intra prediction mode parallel to a division direction, and thereby the possibility that a deterioration in prediction performance will occur due to using, for generation of predicted pixels, pixels referred to by prediction modes in the vicinity of the one parallel intra prediction mode, that is, reference pixels away from a division line forming the division configuration can be avoided.

On the other hand, in a small-size block in which the positions of reference pixels described above are less likely to be away from each other, pixels referred to by, for example, one intra prediction mode parallel to a division direction and prediction modes in the vicinity of the one parallel intra prediction mode may be used for generation of predicted pixels, and thereby an effect of improving prediction performance can be expected.

The synthesis unit 280 may determine the number of intra prediction modes on the basis of the aspect ratio of the decoding target block, the intra prediction modes being to be included as options.

For example, when the aspect ratio of the unit block is small, the synthesis unit 280 may generate predicted pixels by using predicted pixels generated by one intra prediction mode according to the direction in which division is made by a straight line forming the division configuration of small regions and a plurality of intra prediction modes in the vicinity of the one intra prediction mode.

Further, when the aspect ratio of the unit block is large, the synthesis unit 280 may generate predicted pixels by only one intra prediction mode according to the direction in which division is made by a straight line forming the division configuration of small regions.

The positions of reference pixels between adjacent intra prediction modes (the distances between reference pixels) vary depending on the aspect ratio of the unit block; thus, in a non-square block in which the positions of reference pixels are likely to be away from each other as above, the intra prediction mode may be limited to, for example, one intra prediction mode parallel to a division direction, and thereby the possibility that a deterioration in prediction performance will occur due to using, for generation of predicted pixels, pixels referred to by prediction modes in the vicinity of the one parallel intra prediction mode, that is, reference pixels away from a division line forming the division configuration can be avoided.

On the other hand, in a square block in which the positions of reference pixels described above are less likely to be away from each other, pixels referred to by, for example, one intra prediction mode parallel to a division direction and prediction modes in the vicinity of the one parallel intra prediction mode may be used for generation of predicted pixels, and thereby an effect of improving prediction performance can be expected.

The predicted pixels of small regions A to C are calculated by performing weighted averaging processing using weighting factors according to the division configuration. The synthesis of small regions A to C is achieved by setting a weighting factor for each pixel and subjecting the plurality of predicted pixels to weighted averaging processing using the weighting factors.

Figure 6:
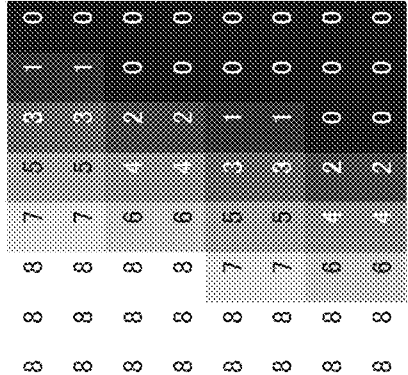
FIG. 6 is a diagram illustrating an example of a calculation method using weighting factors and weighted averaging processing.
Figure 6:
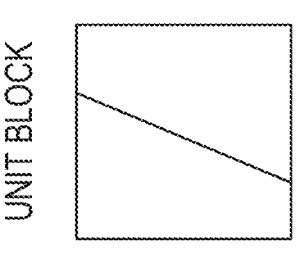

FIG. 6 illustrates an example of a calculation method using weighting factors and weighted averaging processing.

In the case of a combination of intra prediction and motion compensation, based on the fact that the prediction accuracy on the lower right is relatively low, intra prediction may be designed taking account of, in addition to the weighting factors of FIG. 6, the point that, as illustrated in FIG. 7, the weighting factor of intra prediction becomes smaller toward the lower right of the unit block. That is, the synthesis unit 280 may be configured to decrease the weighting factor toward the lower right of the unit block of the decoding target block. In this case, explicit small region division can be omitted by setting the weighting factor w to 0.5 uniformly.

In general, intra prediction is often selected also in unit blocks in the vicinity of a region where intra prediction is selected; thus, the weighting factor may be adaptively changed depending on whether unit blocks in the vicinity are intra prediction or not. That is, the synthesis unit 280 may be configured to adaptively change the weighting factor of a unit block of a decoding target block on the basis of whether a unit block in the vicinity of the unit block of the decoding target block is intra prediction or not.

For example, the weighting factor may be made proportional to the number of intra predictions of unit blocks in the vicinity. That is, the synthesis unit 280 may be configured to determine the weighting factor such that the weighting factor is proportional to the number of, among the unit blocks in the vicinity of a unit block of a decoding target block, unit blocks to which intra prediction is allocated. When there are a large number of intra predictions in the vicinity, the weight r may be increased to strengthen the influence of intra prediction, and when there are a small number of intra predictions in the vicinity, the weight r may be decreased to reduce the influence of intra prediction; thereby, an effect of improving prediction accuracy can be expected.

Further, the image encoding device 100 and the image decoding device 200 may be realized as a program causing a computer to execute each function (each step).

According to the present embodiment, it is possible to improve the overall quality of service in video communications, thereby contributing to Goal 9 of the UN-led Sustainable Development Goals (SDGs) which is to "build resilient infrastructure, promote inclusive and sustainable industrialization and foster innovation".

What is claimed is:

1. An image decoding device comprising a circuit, wherein the circuit:

decodes prediction information and quantized values;

subjects the quantized values to inverse quantization processing to generate transformation coefficients;

subjects the transformation coefficients to inverse transformation processing to generate prediction residuals;

generates predicted pixels on the basis of the prediction information;

adds the outputted prediction residuals and the outputted predicted pixels to acquire decoded pixels;

accumulate the decoded pixels;

generates first predicted pixels on the basis of the decoded pixels and the prediction information; and generates second predicted pixels on the basis of the accumulated decoded pixels and the prediction information, wherein the circuit generates the predicted pixels by performing weighted averaging processing using weighting factors on the first predicted pixels and the second predicted pixels, the circuit employs, in each of a plurality of small regions obtained by dividing a unit block of a decoding target block by at least one oblique straight line, the first predicted pixels or/and the second predicted pixels, and the circuit, when intra prediction is allocated to at least one of the small regions, uses a prediction mode according to a division configuration of the at least one of the small regions.

2. The image decoding device according to claim 1, wherein the circuit selects the prediction mode on the basis of a direction in which division is made by the at least one oblique straight line forming the division configuration.

3. The image decoding device according to claim 1, wherein the circuit adaptively decodes a prediction mode limited according to a type of division of the small regions.

4. The image decoding device according to claim 1, wherein the circuit includes a specific intra prediction mode as an option of the prediction mode.

5. The image decoding device according to claim 1, wherein the at least one oblique line includes a plurality of oblique straight lines, and wherein the circuit includes, as options, at least some of intra prediction modes according to directions in which division is made by the plurality of oblique straight lines forming the division configuration.

6. The image decoding device according to claim 1, wherein the circuit decreases the weighting factor toward lower right of the unit block of the decoding target block.

7. The image decoding device according to claim 1, wherein the circuit adaptively changes the weighting factor of the unit block of the decoding target block on the basis of whether a unit block in the vicinity of the unit block of the decoding target block is intra prediction or not.

8. The image decoding device according to claim 1, wherein the circuit determines the weighting factor such that the weighting factor is proportional to a number of, among unit blocks in the vicinity of the unit block of the decoding target block, unit blocks to which intra prediction is allocated.

9. The image decoding device according to claim 1, wherein the circuit limits the prediction mode to a prediction mode in a direction parallel to a direction in which division is made by the at least one oblique straight line forming the division configuration.

10. The image decoding device according to claim 1, wherein the circuit limits the prediction mode to prediction modes in directions parallel to and perpendicular to a direction in which division is made by the at least one oblique straight line forming the division configuration.

11. The image decoding device according to claim 1, wherein the circuit limits the prediction mode to prediction modes in directions parallel to and perpendicular to a direction in which division is made by the at least one oblique straight line forming the division configuration, and a planar mode.

12. The image decoding device according to claim 1, wherein the circuit determines a number of intra prediction modes on the basis of a block size of a decoding target, the intra prediction modes being to be included as options.

13. The image decoding device according to claim 1, wherein the circuit determines a number of intra prediction modes on the basis of an aspect ratio of a decoding target block.

14. The image decoding device according to claim 1, wherein the at least one oblique line includes a plurality of oblique straight lines.

15. The image decoding device according to claim 1, wherein the at least one oblique line includes a plurality of oblique straight lines that meet or intersect at a common point.

16. The image decoding device according to claim 1, wherein the at least one oblique line includes three oblique straight lines that meet at a common point.

17. The image decoding device according to claim 1, wherein the at least one oblique line includes three oblique straight lines configured such that the plurality of small regions consists of three small regions.

18. The image decoding device according to claim 1, wherein the circuit allocates motion compensation to at least one of the small regions, according to the division configuration of the at least one of the small regions.

19. An image decoding method, comprising:

(A) decoding and outputting prediction information and quantized values;

(B) subjecting the quantized values outputted in the step (A) to inverse quantization processing to generate transformation coefficients and outputting the transformation coefficients;

(C) subjecting the transformation coefficients outputted in the step (B) to inverse transformation processing to generate prediction residuals and outputting the prediction residuals;

(D) generating predicted pixels on the basis of the prediction information outputted in the step (A) and outputting the predicted pixels;

(E) adding the prediction residuals outputted in the step (C) and the predicted pixels outputted in the step (D) to acquire decoded pixels and outputting the decoded pixels;

(F) accumulating the decoded pixels outputted in the step (E);

(G) generating predicted pixels on the basis of the decoded pixels outputted in the step (E) and the prediction information outputted in the step (A) and outputting the predicted pixels; and (H) generating predicted pixels on the basis of the decoded pixels accumulated in the step (F) and the prediction information outputted in the step (A) and outputting the predicted pixels, wherein in the step (D), the predicted pixels are generated by performing weighted averaging processing using weighting factors on the predicted pixels outputted in the step (G) and the predicted pixels outputted in the step (H), in the step (D), in each of a plurality of small regions obtained by dividing a unit block of a decoding target block by at least one oblique straight line, the predicted pixels generated in the step (G) or/and the predicted pixels generated in the step (H) is employed, and in the step (D), when intra prediction is allocated to at least one of the small regions, a prediction mode according to a division configuration of the small regions is used.

20. A non-transitory computer-readable storage medium storing a program for causing a computer to function as an image decoding device, the image decoding device including a circuit, wherein the circuit:

decodes prediction information and quantized values;

subjects the quantized values to inverse quantization processing to generate transformation coefficients;

subjects the transformation coefficients to inverse transformation processing to generate prediction residuals;

generates predicted pixels on the basis of the prediction information;

adds the prediction residuals and the predicted pixels to acquire decoded pixels;

accumulates the decoded pixels;

generates first predicted pixels on the basis of the decoded pixels and the prediction information; and generates second predicted pixels on the basis of the accumulated decoded pixels a and the prediction information, wherein the circuit generates the predicted pixels by performing weighted averaging processing using weighting factors on the first predicted pixels and the second predicted pixels, the circuit employs, in each of a plurality of small regions obtained by dividing a unit block of a decoding target block by at least one oblique straight line, the first predicted pixels or/and the second predicted pixels, and the circuit, when intra prediction is allocated to the small region, uses a prediction mode according to a division configuration of the small regions.

* * * * *